United States Patent
Isoya et al.

(10) Patent No.: US 9,851,234 B2
(45) Date of Patent: Dec. 26, 2017

(54) PHYSICAL QUANTITY MEASURING DEVICE

(71) Applicant: Hitachi Automotive Systems, Ltd., Hitachinaka-shi, Ibaraki (JP)

(72) Inventors: Yuki Isoya, Hitachinaka (JP); Hiroaki Hoshika, Hitachinaka (JP); Takayuki Yogo, Hitachinaka (JP); Takahiro Miki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 126 days.

(21) Appl. No.: 14/898,166

(22) PCT Filed: Feb. 5, 2014

(86) PCT No.: PCT/JP2014/052615
§ 371 (c)(1),
(2) Date: Dec. 14, 2015

(87) PCT Pub. No.: WO2014/203555
PCT Pub. Date: Dec. 24, 2014

(65) Prior Publication Data
US 2016/0146651 A1 May 26, 2016

(30) Foreign Application Priority Data

Jun. 20, 2013 (JP) ................................. 2013-129123

(51) Int. Cl.
*G01F 1/68* (2006.01)
*G01M 15/00* (2006.01)
(Continued)

(52) U.S. Cl.
CPC ............ *G01F 1/684* (2013.01); *G01F 1/6845* (2013.01); *G01F 15/14* (2013.01)

(58) Field of Classification Search
USPC ....................................... 73/114.34
See application file for complete search history.

(56) References Cited

U.S. PATENT DOCUMENTS 5,440,924 A 8/1995 Itsuji et al.
5,644,079 A 7/1997 Rilling et al.
(Continued)

FOREIGN PATENT DOCUMENTS

EP 1 279 934 A2 1/2003
EP 1279934 A2 * 1/2003 ............. G01F 1/684
(Continued)

OTHER PUBLICATIONS

Extended European Search Report issued in counterpart European Application No. 14813464.6 dated Jan. 30, 2017 (eight (8) pages).
(Continued)

*Primary Examiner* — Clayton E Laballe
*Assistant Examiner* — Warren K Fenwick
(74) *Attorney, Agent, or Firm* — Crowell & Moring LLP (57) ABSTRACT

A physical quantity measuring device includes a chip package and a casing. The casing fixedly stores the chip package. The casing includes a first bypass passage allowing a gas to be measured taken from a main passage, to flow in a first measuring unit, and a second bypass passage allowing the gas to be measured taken from the main passage, to flow in a second measuring unit. The chip package is configured to dispose a signal processing unit between the first and second measuring units. The casing has a cooling unit that allows the gas to be measured from the main passage to flow between the first measuring unit and the second measuring unit, and cooling the signal processing unit.

8 Claims, 10 Drawing Sheets (51) Int. Cl.
*G01F 1/684* (2006.01)
*G01F 15/14* (2006.01)

(56) References Cited

U.S. PATENT DOCUMENTS

| | | | | |
|---|---|---|---|---|
| 6,694,810 | B2* | 2/2004 | Ueyama | G01F 1/684 |
| | | | | 73/204.22 |
| 7,360,416 | B2* | 4/2008 | Manaka | G01F 1/684 |
| | | | | 73/204.26 |
| 7,574,910 | B2* | 8/2009 | Manaka | G01N 25/66 |
| | | | | 73/204.26 |
| 7,963,161 | B2* | 6/2011 | Morino | G01F 1/6842 |
| | | | | 73/202.5 |
| 8,091,413 | B2* | 1/2012 | Saito | G01F 5/00 |
| | | | | 73/114.33 |
| 2005/0224936 | A1* | 10/2005 | Wu | H01L 23/3128 |
| | | | | 257/678 |
| 2010/0031737 | A1 | 2/2010 | Saito et al. | |
| 2013/0055799 | A1* | 3/2013 | Tsujii | G01F 1/6842 |
| | | | | 73/114.32 |
| 2015/0177043 | A1 | 6/2015 | Tokuyasu et al. | |

FOREIGN PATENT DOCUMENTS

| | | |
|---|---|---|
| EP | 2 154 494 A1 | 2/2010 |
| JP | 5-231899 A | 9/1993 |
| JP | 6-207842 A | 7/1994 |
| JP | 9-503312 A | 3/1997 |
| JP | 2010-43883 A | 2/2010 |
| JP | 2010-151795 A | 7/2010 |
| JP | 2013-120103 A | 6/2013 |
| WO | WO 2008/086045 A2 | 7/2008 |

OTHER PUBLICATIONS

International Search Report (PCT/ISA/210) issued in PCT Application No. PCT/JP2014/052615 dated Mar. 11, 2014 with English translation (Six (6) pages).

* cited by examiner

PHYSICAL QUANTITY MEASURING DEVICE

TECHNICAL FIELD

The present invention relates to a physical quantity measuring device preferably measuring a physical quantity of a gas to be measured.

BACKGROUND ART

There has been a physical quantity measuring device including a measuring unit for measuring a physical quantity, such as the flow rate, the pressure, the temperature, or the humidity of ages to be measured. For example, the measuring unit for measuring a physical quantity includes a flow measuring device including a flow measuring element. The flow measuring element includes a thermal, flow measuring element, and the thermal, flow measuring element is a sensor having a heater element and a thermopile element formed on a silicon substrate, and measuring the flow rate in a measuring unit based on transfer of heat of the heater element.

The flow sensor can measure a wide flow range, has a relatively good accuracy, and is inexpensive, so that the flow sensor is widely used for consumer measuring instruments and industrial measuring instruments. Further, in recent years, integration density of large-scale integrated circuits has been considerably increasing and size-to-performance efficiency thereof has been extremely increased, and now the large-scale integrated circuits are used for every consumer/industrial electronic device.

In an automotive field, for example, an intake air flow measuring device is used for an internal-combustion engine, and the intake air flow measuring device at least includes a casing forming an auxiliary air passage, and a flow sensor disposed in the auxiliary air passage (sub-passage). The intake air flow measuring device is disposed in a main passage (also referred to as an intake pipe), and intake air flowing in the main passage is partially taken into the auxiliary air passage. A flow rate detection unit of the flow sensor outputs a signal according to a flow rate of the intake air taken into the auxiliary air passage, the flow sensor has a large-scale integrated circuit (signal processing unit), and the large-scale integrated circuit processes the output signal.

In particular, in recent years, an electronically-controlled fuel injection device has been generally used for automobiles, but in an engine compartment, sensors or control devices are closely disposed. Consequently, the number of harnesses for connecting various sensors and control devices for controlling the sensors is increased, and the harnesses are complicated. Thus, the sensors or control devices have been integrated with each other to reduce the number of parts and further improve internal appearance of the engine compartment.

Therefore, in terms of reduction in number of parts and improvement in appearance, a unit for measuring a physical quantity other than the intake air flow rate, such as a temperature measuring unit, a humidity measuring unit, or a pressure measuring unit has been integrated into a device.

For example, as an example of such a device, PTL 1 discloses "a mass intake air flow measurement device integrally incorporating a mass air flow measurement device for measuring a mass intake air flow in an air intake tube and a humidity sensing device for sensing humidity in the air intake tube, the mass intake air flow measurement device including a mass air flow sensing element for sensing the mass intake air flow, the mass air flow sensing element being mounted in a bypass passage into which part of air flowing in the air intake tube is drawn, and a humidity sensing device for sensing humidity, the humidity sensing device being mounted in a second bypass passage opened in the bypass passage".

CITATION LIST

Patent Literature

PTL 1: Japanese Unexamined Patent Application Publication No. 2010-43883

SUMMARY OF INVENTION

Technical Problem

However, in such a device as disclosed in PTL 1, a plurality of measuring units for measuring the physical quantities of the gas to be measured are collectively integrated in one device, and thus, these measuring units tend to be influenced by heat between them. Further, the signal processing unit being the large-scale integrated circuit tends to be heated, since the integration density has been increased in recent years, and the signal processing unit is electrically connected to a plurality of measuring units. Accordingly, the measuring units are influenced by heat of the other measuring units or the signal processing unit, other than the heat of the gas to be measured, and accuracy of the measurements performed by the measuring units may be deteriorated.

The present invention has been made in view of the above, and an object of the present invention is to provide a physical quantity measuring device for reducing the influence of heat, other than the heat of a gas to be measured, on a measuring unit for measuring a physical quantity of the gas to be measured.

Solution to Problem

In order to solve the above problems, the physical quantity measuring device according to the present invention includes a chip package and a casing. The chip package is molded from a polymeric resin, including first and second measuring units measuring first and second physical quantities of the gas to be measured, and a signal processing unit connected to the first and second measuring units, and processing signals transmitted from the first and second measuring units. The casing fixedly stores the chip package, and includes first and second bypass passages allowing the gas to be measured taken from a main passage, to flow in the first measuring unit. In the chip package, the signal processing unit is disposed between the first and second measuring units. In the casing, a cooling unit is formed, and the cooling unit allows the gas to be measured from the main passage to flow between the first measuring unit and the second measuring unit, and cools the signal processing unit.

Advantageous Effects of Invention

According to the present invention, influence of heat, other than the heat of the gas to be measured, on a measuring unit for measuring a physical quantity of the gas to be measured can be reduced.

BRIEF DESCRIPTION OF DRAWINGS

FIGS. 9A and 9B are diagrams of the thermal flowmeter illustrated in FIG. 2, the thermal flowmeter without covers.

DESCRIPTION OF EMBODIMENT

An embodiment of the present invention will be described below with reference to the drawings. In the following embodiment, as an example of a physical quantity measuring device according to the present invention, a thermal flowmeter is exemplified which measures a flow rate and a humidity of a gas to be measured, and is mounted to an internal-combustion engine. A physical quantity to be measured of the gas to be measured and a device to be mounted is not limited to this example, as long as the following function and effect can be expected.

Figure 1:
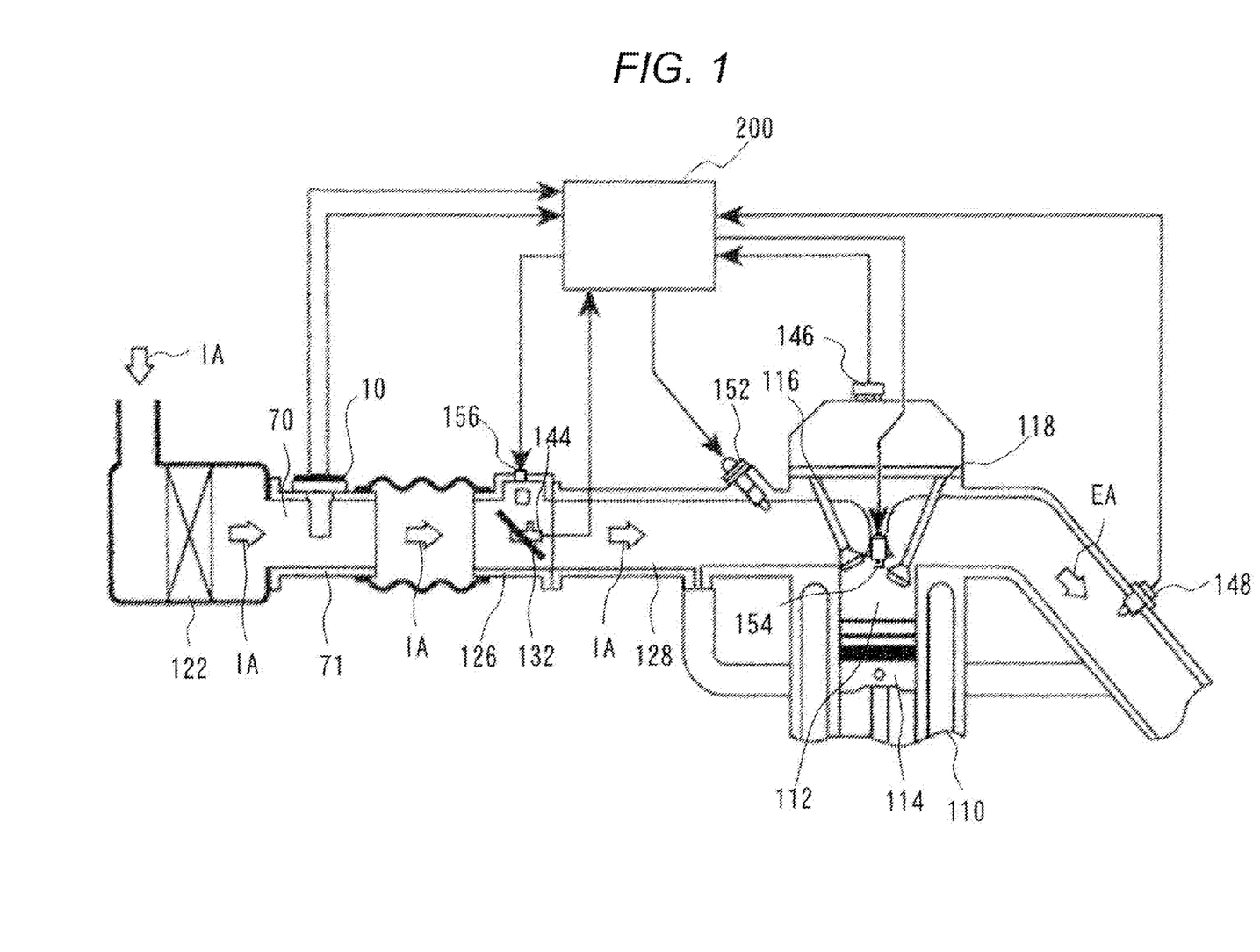
FIG. 1 is a systematic view illustrating an embodiment of an internal-combustion engine control system of an electronic fuel injection type, using a thermal flowmeter as a physical quantity measuring device according to the present invention.

FIG. 1 is a systematic view illustrating an embodiment of an internal-combustion engine control system of an electronic fuel injection type, using a thermal flowmeter according to the present embodiment. As illustrated in FIG. 1, based on operation of an internal-combustion engine 110 including an engine cylinder 112 and an engine piston 114, intake air is taken as a gas IA to be measured from an air cleaner 122, and introduced to a combustion chamber of the engine cylinder 112 through, for example, an intake body including an intake pipe 71 in which a main passage 70 is formed, a throttle body 126, and an intake manifold 128.

A flow rate of the gas IA to be measured being the intake air introduced to the combustion chamber is measured by the thermal flowmeter 10 according to the present embodiment, fuel is supplied from a fuel injection valve 152 based on the measured flow rate, and introduced to the combustion chamber in a state of an air-fuel mixture, with the gas IA to be measured being the intake air. Note that, in the present embodiment, the fuel injection valve 152 is provided at an intake port of the internal-combustion engine, the fuel injected into the intake port forms the air-fuel mixture with the gas IA to be measured being the intake air, is introduced to the combustion chamber through an intake valve 116, and is burned to generate mechanical energy.

In addition to the process of injecting the fuel into the intake port of the internal-combustion engine as illustrated in FIG. 1, the thermal flowmeter 10 can be similarly used for a process of directly injecting the fuel into the combustion chambers. Both processes have substantially the same basic concept about a method of measuring a control parameter, including a method of using the thermal flowmeter 10, and a method of controlling the internal-combustion engine, including an amount of fuel supplied or ignition timing, and the process of injecting the fuel into the intake port is illustrated in FIG. 1, as a representative example of both processes.

The fuel and the air introduced to the combustion chamber form a mixture of the fuel and the air, the mixture is combusted by spark ignition of an ignition plug 154 to generate mechanical energy. The burnt gas is introduced from an exhaust valve 118 to an exhaust pipe, and exhausted, as an exhaust air EA, outside a vehicle from the exhaust pipe. The flow rate of the gas IA to be measured being the intake air, introduced to the combustion chamber, is controlled by a throttle valve 132 having an opening changed based on the operation of a gas pedal. The amount of fuel supplied is controlled based on the flow rate of the intake air introduced to the combustion chamber, and when a driver controls the opening of the throttle valve 132 to control the flow rate of the intake air introduced to the combustion chamber, the mechanical energy generated by the internal-combustion engine can be controlled.

A flow rate, a humidity, and a temperature of the gas IA to be measured being the intake air taken from the air cleaner 122 and flowing in the main passage 70 is measured by the thermal flowmeter 10, and electric signals representing the flow rate, the humidity, and the temperature of the intake air are input from the thermal flowmeter 10 to a control device 200. Further, output of a throttle angle sensor 144 measuring the opening of the throttle valve 132 is input to the control device 200, and further, in order to measure a position or a state of the engine piston 114, the intake valve 116, or the exhaust valve 118 of the internal-combustion engine, and further a rotational speed of the internal-combustion engine, output of a rotation angle sensor 146 is input to the control device 200. In order to measure a mixing ratio between an amount of fuel and an amount of air based on the state of the exhaust air EA, output of an oxygen sensor 148 is input to the control device 200.

The control device 200 calculates an amount of fuel injected or the ignition timing, based on the flow rate, the humidity, and the temperature of the intake air as the output of the thermal flowmeter 10, and the rotational speed of the internal-combustion engine input from the rotation angle sensor 146. Based on results of the calculation, an amount of fuel supplied from the fuel injection valve 152, and the ignition timing for ignition by the ignition plug 154 are controlled. Actually, the amount of fuel supplied or the ignition timing are further controlled based on the temperature of the intake air calculated by the thermal flowmeter 10, a state of change in throttle angle, a state of change in rotational speed of an engine, and a state of the air-fuel ratio calculated by the oxygen sensor 148. Further, during an idling operation of the internal-combustion engine, the control device 200 controls the amount of air bypassing the throttle valve 132 by an idle air control valve 156, and controls the rotational speed of the internal-combustion engine during the idling operation.

Any of the amount of fuel supplied or the ignition timing, mainly controlled in the internal-combustion engine, is calculated based on the output of the thermal flowmeter 10 as a main parameter. Consequently, improvement of measurement accuracy, inhibition of temporal change, improvement of reliability of the thermal flowmeter 10 are important for improvement of control accuracy or ensuring reliability of a vehicle. In particular, in recent years, fuel saving in vehicles or exhaust purification has been increasingly demanded. In order to meet these demands, it is very important to improve the accuracy of measuring the flow rate of the gas IA to be measured being the intake air measured by the thermal flowmeter 10.

Figure 2:
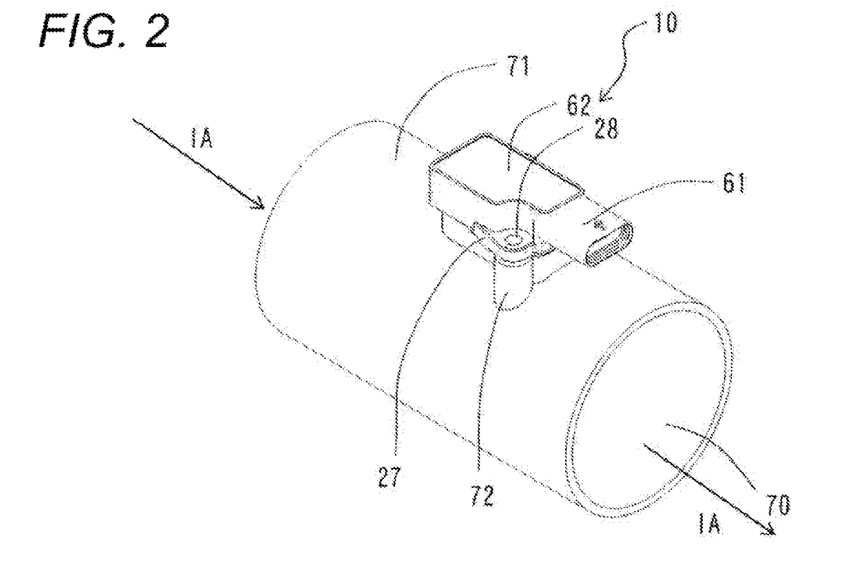
FIG. 2 is a perspective view illustrating a thermal flowmeter according to an embodiment of the present invention, the thermal flowmeter being mounted to an intake pipe.

FIG. 2 is a perspective view illustrating the thermal flowmeter according to an embodiment of the present invention, the thermal flowmeter being mounted to an intake pipe. As illustrated in FIG. 2, the thermal flowmeter 10 is inserted into an opening portion of the intake pipe 71. Specifically, a housing 20 constituting the thermal flowmeter 10, which will be described later, has a support portion 27, and the mounting base 72 is mounted to the intake pipe 71 with a fastener such as a screw through a mounting hole 28, while being supported by a mounting base 72 of the intake pipe 71. An O-ring 63 is disposed to close a gap between the thermal flowmeter 10 and a wall surface of the opening portion of the intake pipe 71. The signals represent the flow rate, the humidity, the temperature, and the pressure of the gas IA to be measured, which are physical quantities measured by the thermal flowmeter 10 described later, and the signals are transmitted to the control device 200 through an external terminal disposed in a connector 61. Further, the connector 61 has an upper surface to which an upper surface cover 62 is mounted.

Figure 3:
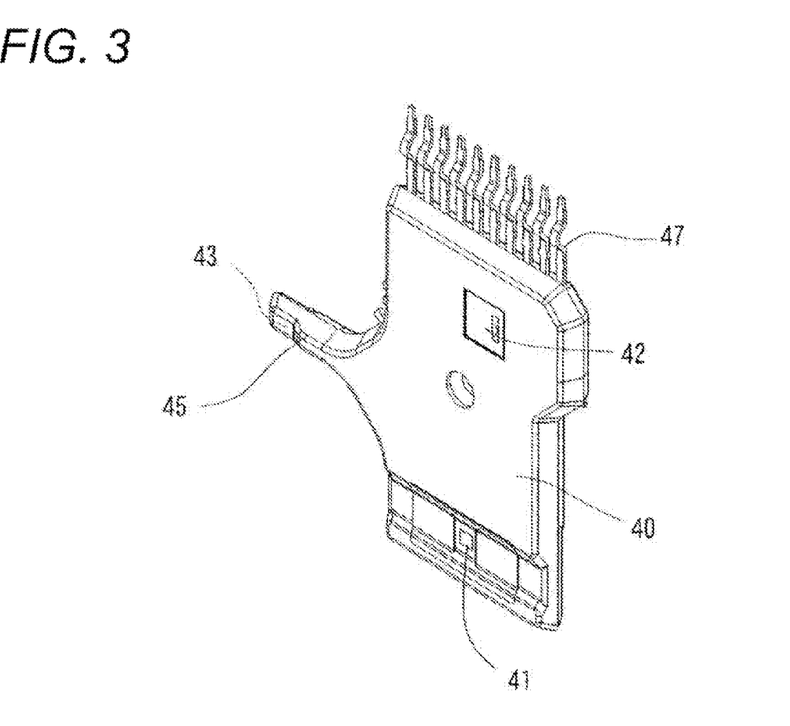
FIG. 3 is a perspective view of a chip package according to the present embodiment.
Figure 4A:
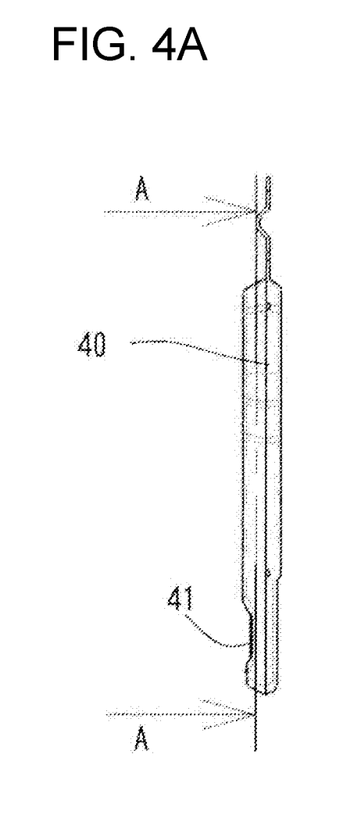
FIG. 4A is a side view of the chip package illustrated in FIG. 3.
Figure 4B:
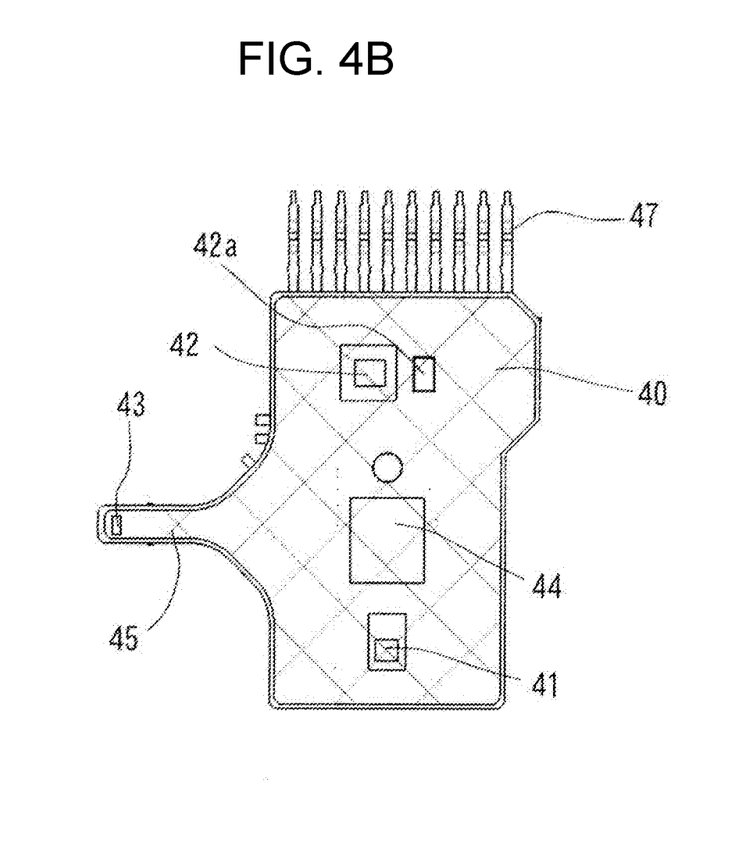
FIG. 4B is a cross-sectional view taken along the arrowed line A-A of FIG. 4A.
Figure 5:
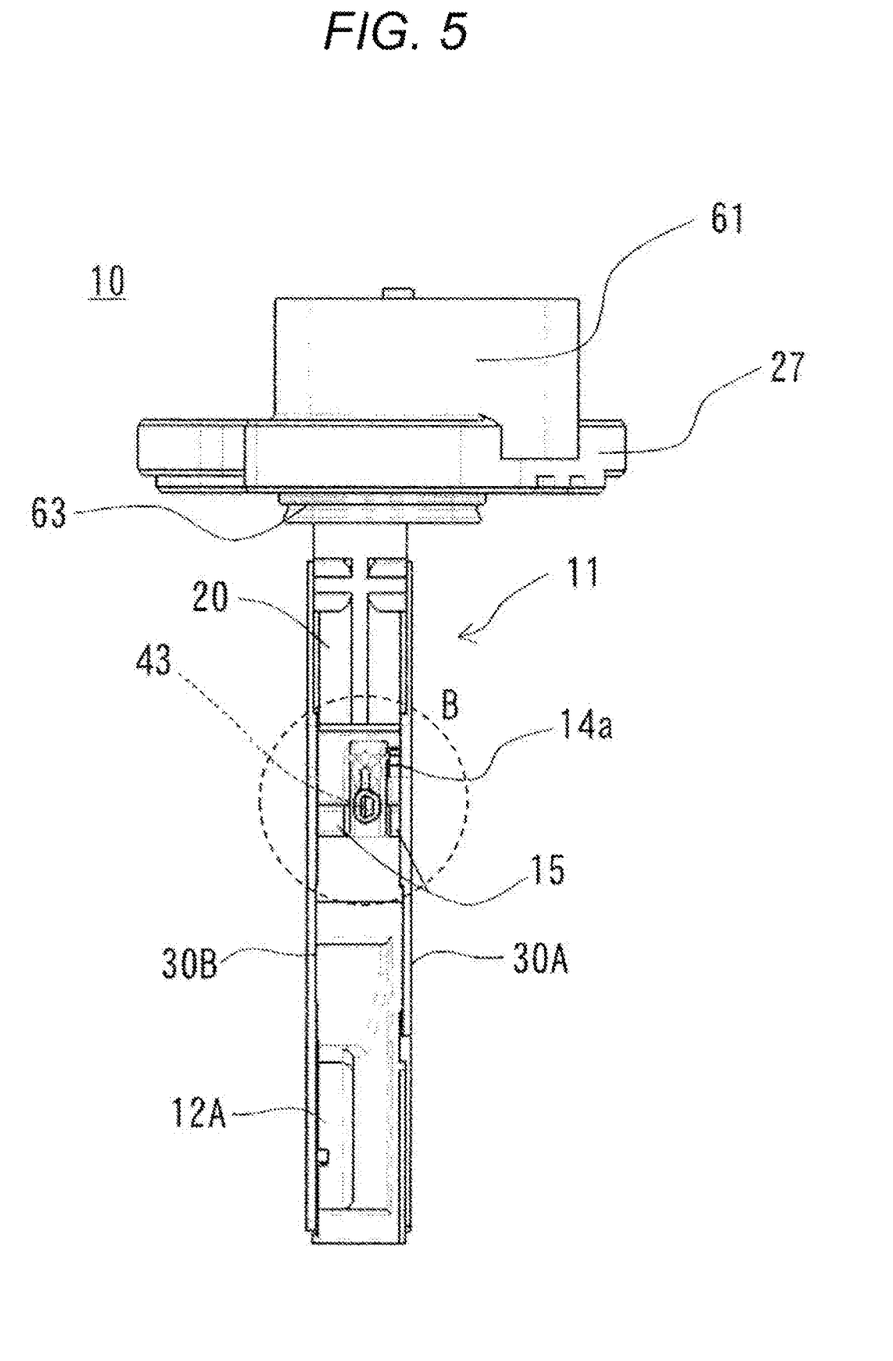
FIG. 5 is a side view of the thermal flowmeter illustrated in FIG. 2, viewed from an upstream side.
Figure 6:
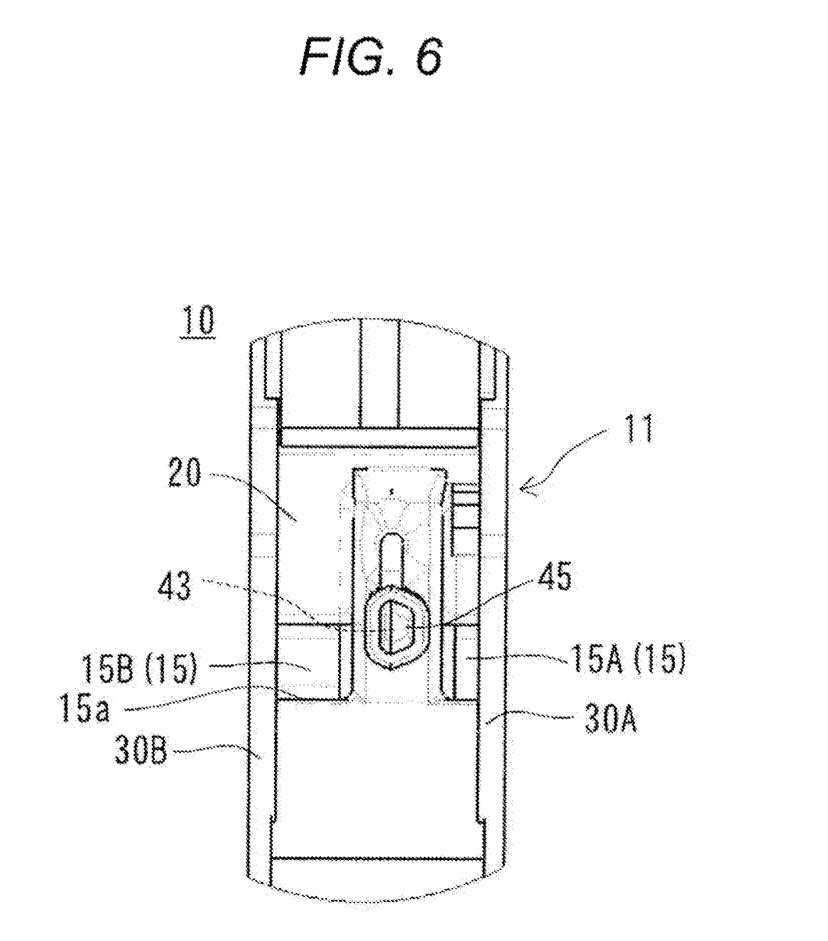
FIG. 6 is an enlarged view of a portion B of FIG. 5.

FIG. 3 is a perspective view of a chip package according to the present embodiment, FIG. 4(A) is a side view of the chip package illustrated in FIG. 3, and FIG. 4(B) is a cross-sectional view taken along the arrowed line A-A of FIG. 4(A). FIG. 5 is a side view of the thermal flowmeter illustrated in FIG. 2, viewed from an upstream side, and FIG. 6 is an enlarged view of a portion B of FIG. 5.

Figure 7:
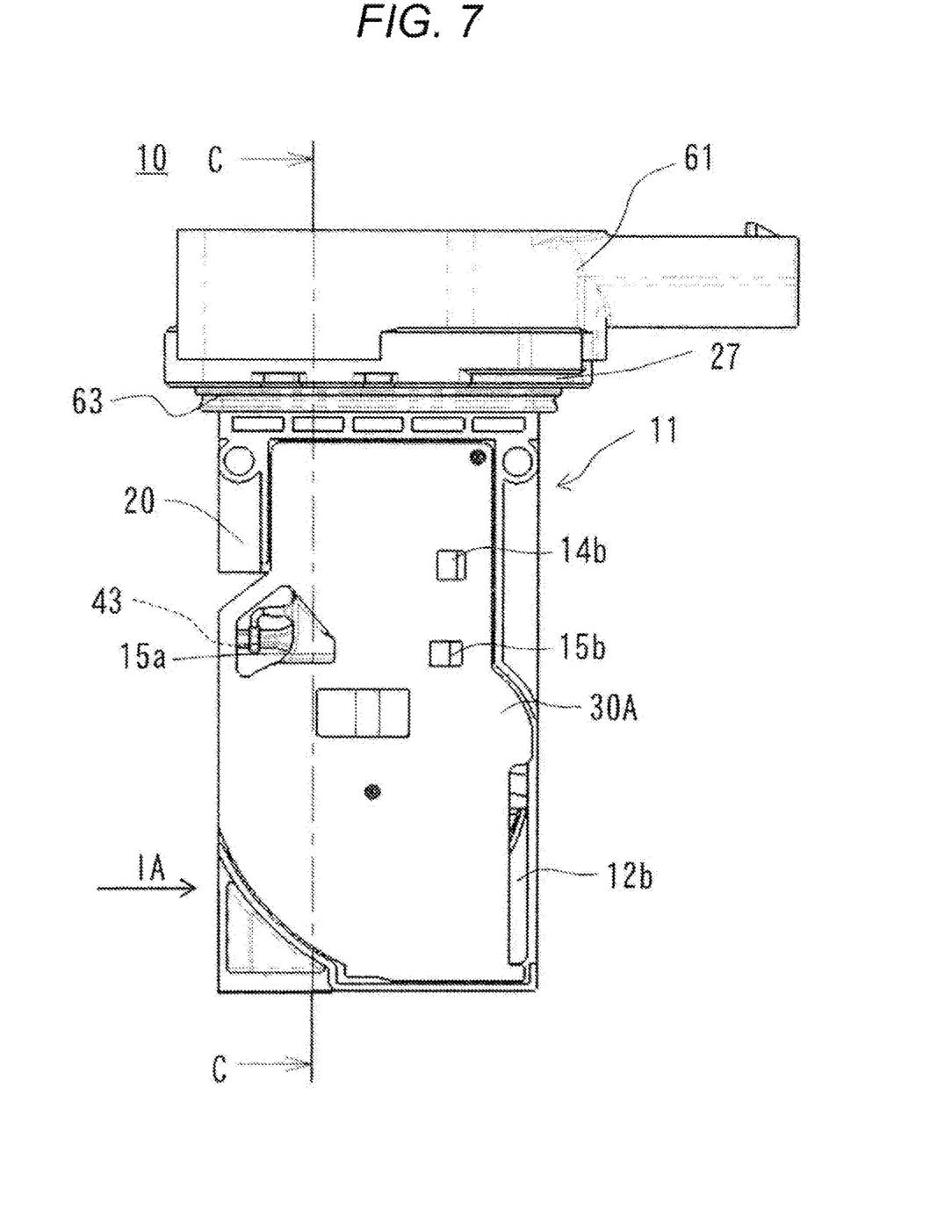
FIG. 7 is a front view of the thermal flowmeter illustrated in FIG. 2.
Figure 8:
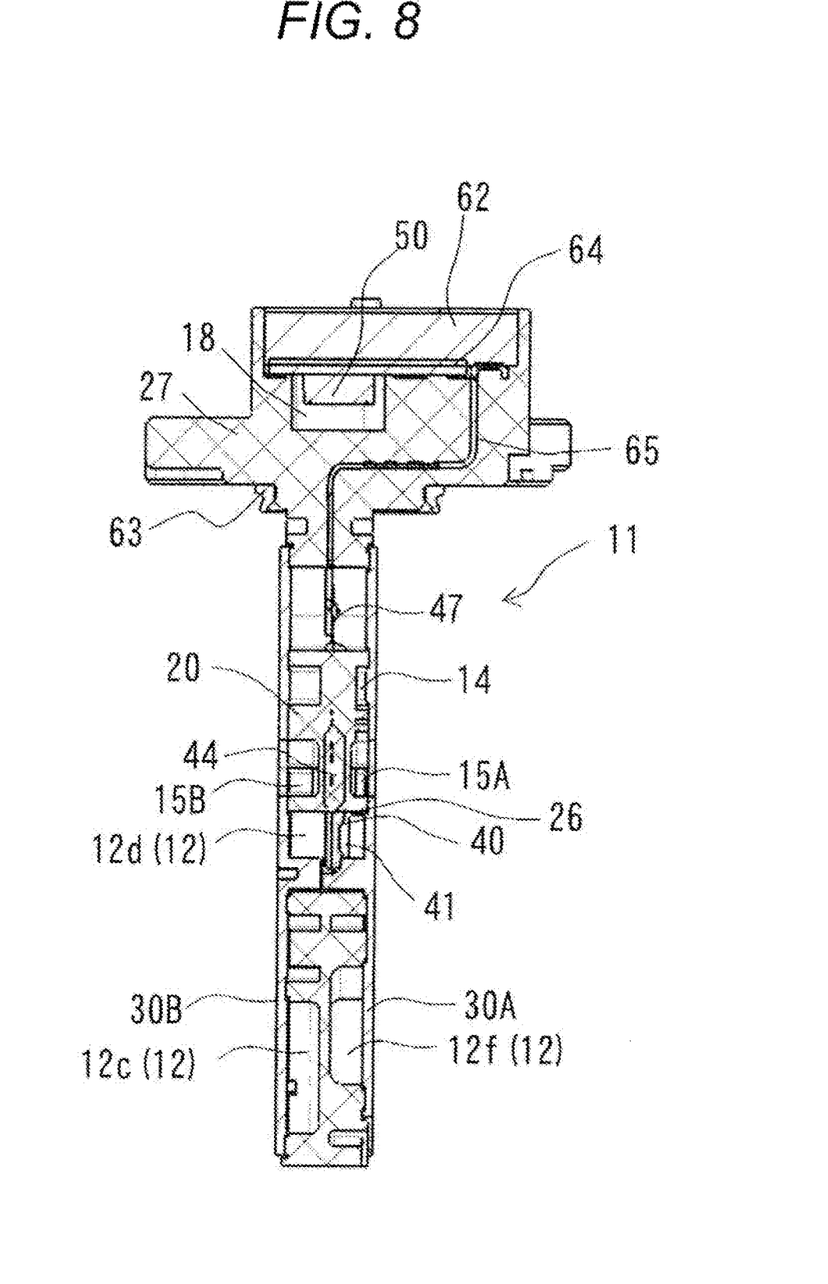
FIG. 8 is a cross-sectional view taken along the arrowed line C-C of FIG. 7.

FIG. 7 is a front view of the thermal flowmeter illustrated in FIG. 2, and FIG. 8 is a cross-sectional view taken along the arrowed line C-C of FIG. 7.

Figure 9A:
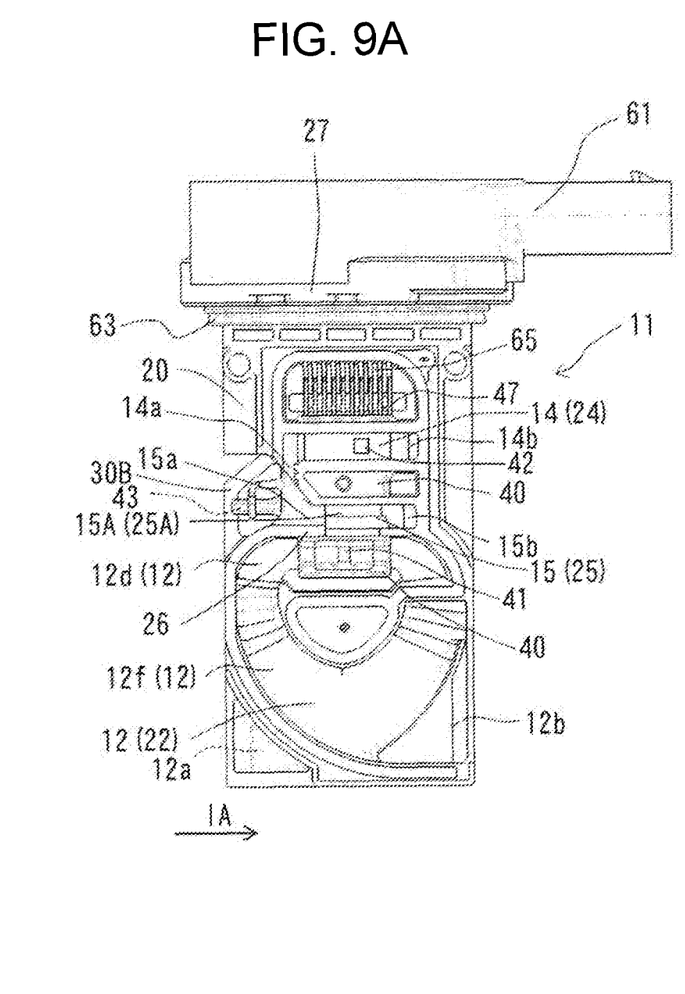
FIG. 9A is a front view of the thermal flowmeter from which a front surface cover is removed.
Figure 9B:
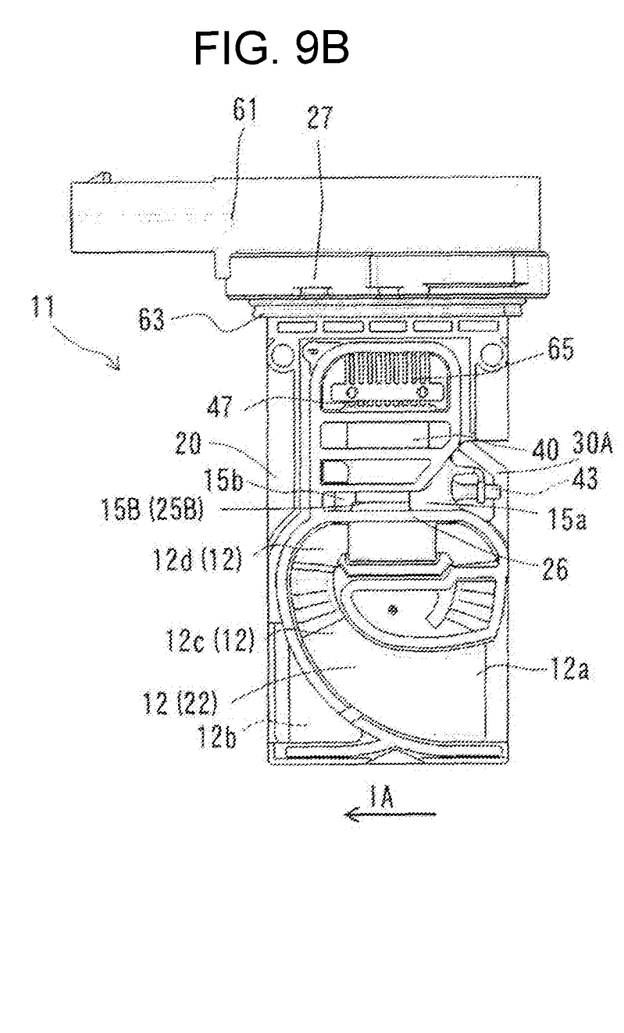
FIG. 9B is a back view of the thermal flowmeter from which a back surface side cover is removed.
Figure 10:
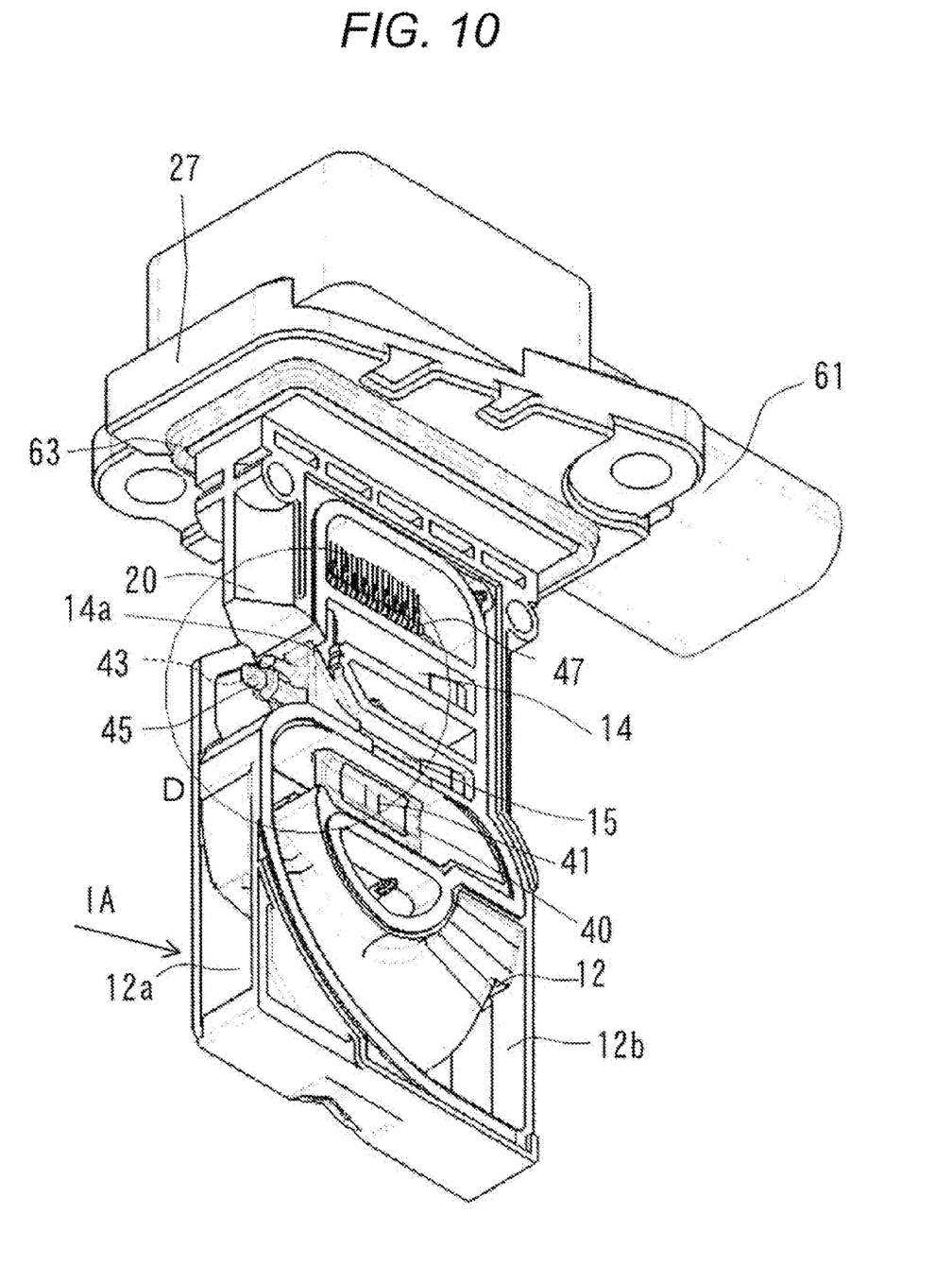
FIG. 10 is a perspective view of the thermal flowmeter of FIG. 9A.
Figure 11:
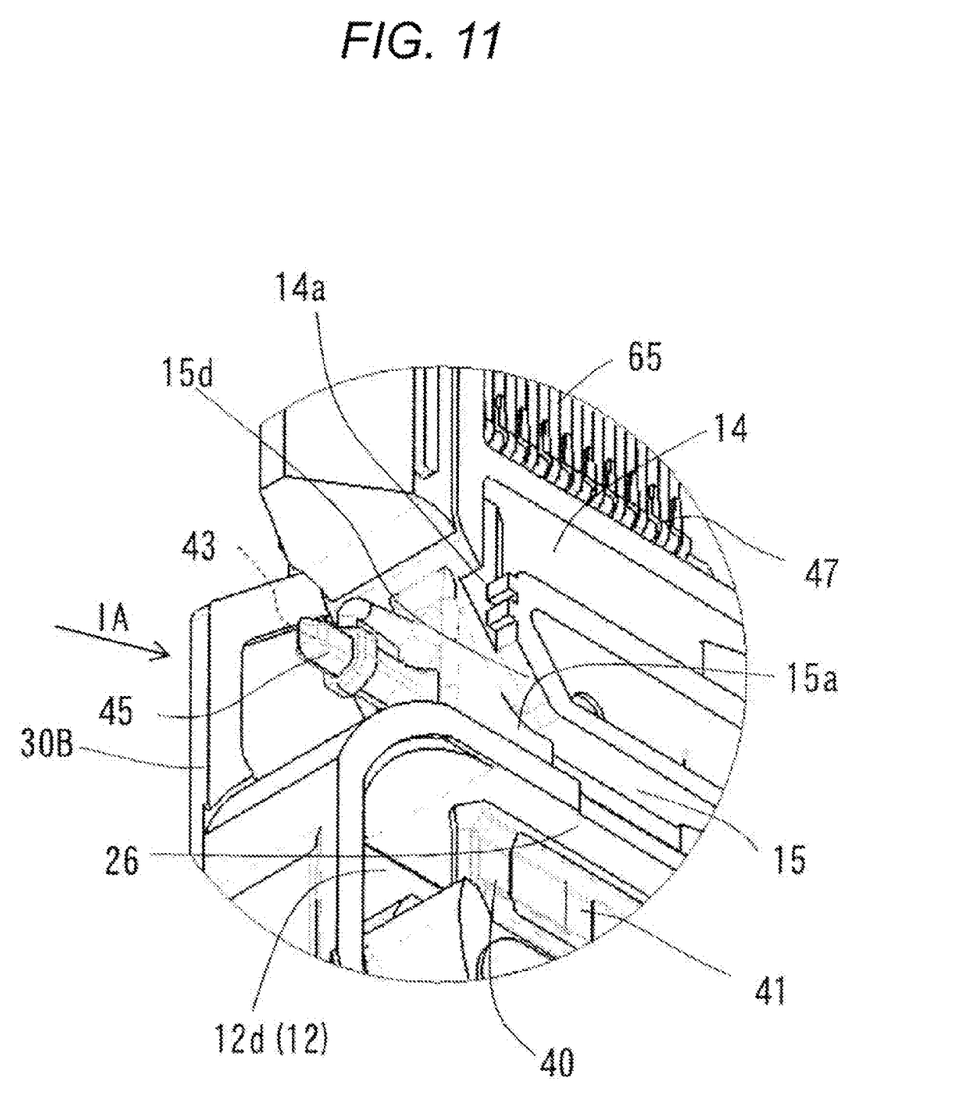
FIG. 11 is an enlarged view of a portion D of FIG. 10.

FIGS. 9(A) and 9(B) are diagrams of the thermal flowmeter illustrated in FIG. 2, the thermal flowmeter without covers, FIG. 9(A) is a front view of the thermal flowmeter from which a front surface cover is removed, and FIG. 9(B) is a back view of the thermal flowmeter from which a back surface cover is removed. FIG. 10 is a perspective view of the thermal flowmeter of FIG. 9(A), and FIG. 11 is an enlarged view of a portion D of FIG. 10.

The thermal flowmeter 10 according to the present embodiment includes the chip package 40 illustrated in FIG. 3 and FIGS. 4(A) and 4(B), the housing 20 for fixedly storing the chip package 40, and the front surface cover 30A and the back surface cover 30B mounted to the front surface and the back surface of the housing 20, respectively (see FIG. 5). In the present embodiment, the front surface cover 30A and the back surface cover 30B are mounted to the front surface and the back surface of the housing 20, respectively, to form the casing 11 for fixedly storing the chip package 40.

The chip package 40 at least includes the first and second measuring units for measuring the first and second physical quantities of the gas IA to be measured taken in the first and second bypass passages (sub-passages) 12 and 14 (see FIGS. 9(A) and 9(B)) of the thermal flowmeter 10 described later, from the main passage 70.

Specifically, in the present embodiment, as illustrated in FIGS. 3 to 9, the first measuring unit is a flow measuring unit 41 for measuring the flow rate (first physical quantity) of the gas to be measured flowing in the first bypass passage (first sub-passage) 12 formed in the thermal flowmeter 10. The second measuring unit is a humidity measuring unit 42 for measuring the humidity (second physical quantity) of the gas to be measured flowing in the second bypass passage (second sub-passage) 14 formed in the thermal flowmeter 10.

Further, in the present embodiment, as illustrated in FIG. 4, the chip package 40 is also provided with a temperature measuring unit (temperature measuring element) 43. Further, as illustrated in FIG. 8, in the thermal flowmeter according to the present embodiment, a third bypass passage 18 for pressure measurement is formed in the casing 11, and in the third bypass passage 18, the gas to be measured from the main passage 70 flows. A pressure measuring unit 50 is disposed in the third bypass passage 18, and the pressure measuring unit 50 measures the pressure of the gas to be measured.

The chip package 40 is provided with a plurality of connection terminals 47 for inputting/outputting signals to a signal processing unit 44, and the plurality of connection terminals 47 are electrically connected to a control circuit board 64 through a lead frame 65.

Returning to FIG. 4(b), the flow measuring unit 41 being the first measuring unit, the humidity measuring unit 42 being the second measuring unit, and the temperature measuring unit (temperature measuring element) 43 are electrically connected to the signal processing unit 44 including a large-scale integrated circuit (LSI) through a wire such as a gold wire, as illustrated in FIG. 4(b). The signal processing unit 44 is disposed between the flow measuring unit 41 and the humidity measuring unit 42.

The flow measuring unit 41 performs general heat flow measurement, performing heat transfer with the gas to be measured flowing in the first bypass passage (first sub-passage) 12, measuring the flow rate of the gas to be measured. Specifically, in the flow measuring unit 41, a diaphragm is formed, as a temperature detecting element, on a flat substrate including a material having good heat conductivity, such as, silicon or ceramic. On the diaphragm, a heat resistor and a thermosensitive resistor are disposed (not illustrated), the heat resistor heats the gas to be measured, and the thermosensitive resistor detects the temperature of a fluid heated by the heat resistor. The signal processing unit 44 applies electrical current to the heat resistor to control the heat of the heat resistor, and measures the flow rate of the gas to be measured based on the amount of heat of the fluid heated by the heat resistor. That is, the signal processing unit 44 processes an output signal from the flow measuring unit 41 according to a flow rate.

In contrast, in the humidity measuring unit 42, a diaphragm is formed, as a thermal, humidity detecting element, on a flat substrate including a material having good heat conductivity, such as, silicon or ceramic. The diaphragm is provided with a temperature detecting resistor (not illustrated) and a heat resistor 42a. The signal processing unit 44 controls the heat of the heat resistor 42a, and measures the humidity based on an output signal from the temperature detecting resistor. That is, the signal processing unit 44 processes the output signal from the flow measuring unit 41 according to a flow rate.

The flow measuring unit 41 being the first measuring unit and the humidity measuring unit 42 being the second measuring unit, and the signal processing unit 44 are integrally molded, for example, from a polymeric resin such as a thermosetting resin, and formed into the chip package 40.

The housing 20 has a recessed portion 22 for the first bypass passage and a recessed portion 24 for the second bypass passage, which form passages allowing the gas to be measured taken from the main passage 70 to flow. The recessed portion 22 for the first bypass passage is a recessed portion formed on a front surface side and a back surface side of the housing 20. The front surface side of the housing 20 is covered by the front surface cover 30A, and the back surface side thereof is covered by the back surface cover 30B, and the casing 11 is formed. In the casing 11, the first bypass passage 12 is formed which allows the gas to be measured taken from the main passage 70 to flow in the flow measuring unit 41.

As illustrated in FIGS. 5 to 9, in the first bypass passage 12, an inlet 12a is formed in a side surface of the casing 11, facing an upstream side of the main passage 70, and an outlet 12b is formed in a side surface of the casing 11, facing a downstream side of the main passage 70. The gas to be measured taken from the inlet 12a of the first bypass passage 12 passes a back surface side bypass passage 12c formed on the back surface side. The gas to be measured passes the flow measuring unit 41 disposed in a penetration portion 12d penetrating a front surface and a back surface, and the gas to be measured passes a front surface side bypass passage 12f formed on the front surface side, and flows out from the outlet 12b.

The recessed portion 24 for the second bypass passage is a recessed portion formed on the front surface side of the housing 20. The front surface side of the housing 20 is covered by the front surface cover 30A, and the second bypass passage 14 is formed in the casing 11. In the second bypass passage 14, an inlet 14a is formed in a side surface of the casing 11, facing the upstream side of the main passage 70, and an outlet 14b is formed in the front surface over 30A constituting the casing 11. The gas to be measured taken from the inlet 14a of the second bypass passage 14 passes the humidity measuring unit 42, and the gas to be measured flows out from the outlet 14b formed in the front surface cover 30A.

Note that the signal processing unit 44 is the large-scale integrated circuit (LSI), and tends to be heated, since the integration density has been increased in recent years, and the signal processing unit is electrically connected to the plurality of measuring units (the flow measuring unit 41, the humidity measuring unit 42, and the temperature measuring unit 43). Accordingly, the measuring units are influenced by heat of the other measuring units or the signal processing unit 44, other than the heat of the gas to be measured, and accuracy of the measurements performed by the measuring units may be deteriorated.

Thus, in the present embodiment, a cooling passage (cooling unit) 15 is formed which allows the gas to be measured from the main passage 70 to flow between the flow measuring unit 41 and the humidity measuring unit 42, and cools the signal processing unit 44. Accordingly, the signal processing unit can be cooled. In the present embodiment, the flow measuring unit 41 and the humidity measuring unit 42 particularly use the heat resistors to measure the flow rate and the humidity, so that both of the flow measuring unit 41 and the humidity measuring unit 42 generate heat. Thus, although heat of the heat resistor of the flow measuring unit 41 or heat of the heat resistor of the humidity measuring unit 42 may influence the other, provision of the cooling passage 15 can reduce mutual influence of the heat between these measuring units, as described below.

Specifically, the cooling passage 15 is provided with a recessed portion 25A for a front surface side cooling passage, in the front surface of the housing 20, and a recessed portion 25B for a back surface side cooling passage, in the back surface thereof. The front surface side of the housing 20 is covered by the front surface cover 30A, and the back surface side thereof is covered by the back surface cover 30B, and the cooling passage 15 is formed. Thus, the cooling passage 15 including a front surface side cooling passage 15A and a back surface side cooling passage 15B is formed in the casing 11. Note that, in the present embodiment, the recessed portion 25A for the front surface side cooling passage and the recessed portion 25B for the back surface side cooling passage continuously penetrate the housing 20, but the recessed portions are not particularly limited in shape, as long as the cooling passage 15 can be formed on both sides of the chip package 40.

As described above, the signal processing unit 44 can be cooled by a cooling medium being the gas to be measured. In the present embodiment, both of the flow measuring unit 41 and the humidity measuring unit 42 particularly include the heat resistors, so that flow of the gas to be measured (cooling medium) between the flow measuring unit 41 and the humidity measuring unit 42 can reduce mutual influence of the heat. Accordingly, deterioration in accuracy of the measuring units caused by temperature drift, and further, reduction of life of the signal processing unit 44 being the large-scale integrated circuit can be inhibited.

Although the cooling passage 15 for cooling the signal processing unit 44 mounted to the chip package 40 is formed in the casing 11, for example, a cooling unit may be employed which includes a recessed groove portion directly expose the signal processing unit 44 in the main passage 70, and allows the gas to be measured flow therein, or a cooling passage may be formed in one surface of the signal processing unit 44. The configuration thereof is not particularly limited as long as the above-mentioned cooling effects are expected.

In the present embodiment, as a further preferable mode, the cooling passage 15 is formed in front and back of the signal processing unit 44 of the chip package 40 by the front surface side cooling passage 15A and the back surface side cooling passage 15B which constitute the above-mentioned cooling passage 15. As described above, the signal processing unit 44 can be efficiently cooled from both sides of the chip package 40, and heat transfer between the flow measuring unit 41 and the humidity measuring unit 42 can be accurately blocked.

Further, in the present embodiment, a partition wall 26 separating the flow measuring unit 41 from the humidity measuring unit 42 is formed in the housing 20, and the partition wall 26 fixes the chip package 40 to the housing 20 (casing 11). The partition wall 26 partially forms the cooling passage 15. As described above, the cooling passage 15 is provided using the partition wall 26 to have a simple configuration, and the fluid in the cooling passage 15 is prevented from flowing into the flow measuring unit 41 and the humidity measuring unit 42.

An intake hole of the cooling passage 15 for taking the gas to be measured, that is, the inlet of the cooling passage 15 is not particularly limited in position and number, as long as the gas to be measured (cooling medium) from the main passage 70 can be taken into the cooling passage. However, as a preferable mode, the intake hole is formed in a side surface of the thermal flowmeter 10, facing the upstream side of the main passage 70, in the present embodiment. Thus, the gas to be measured (cooling medium) flowing in the main passage 70 efficiently flows in the cooling passage 15.

Further, in the present embodiment, the cooling passage 15 is provided between the flow measuring unit 41 and the support portion 27 of the housing 20, and thus, the heat transferred from the intake pipe 71 to the chip package 40 through the housing 20 is inhibited from being transferred to the flow measuring unit 41.

Further, an exhaust hole exhausting the gas to be measured in the cooling passage, that is, the outlet 15*b* of the cooling passage 15 is not particularly limited in position and number, as long as the gas to be measured (cooling medium) from the main passage 70 flows in the cooling passage 15 and is exhausted to the main passage. However, as a further preferable mode, the outlet 15*b* of the front surface side cooling passage 15A and the back surface side cooling passage 15B is formed by providing through-holes in the front surface cover 30A and the back surface cover 30B which constitute passage wall portions, respectively, in the present embodiment. Thus, the gas to be measured (cooling medium) taken into the cooling passage 15 is inhibited from being retained therein, and cooling efficiency can be increased.

Further, the outlet of the cooling passage 15 may be provided in a side surface of the thermal flowmeter 10, facing the downstream side of the main passage 70, but in the present embodiment, the outlet is provided in the front surface cover 30A and the back surface cover 30B (i.e., side surfaces of the casing 11, along a flowing direction of the gas to be measured in the main passage), and thus, the rigidity of the housing 20 can be secured, influence of back flow of the gas to be measured in the main passage 70 can be inhibited, and cooling by the gas to be measured (cooling medium) can be efficiently performed.

An opening area of the exhaust hole exhausting the gas to be measured in the cooling passage 15 may be larger than an opening area of the intake hole of the cooling passage 15 taking the gas to be measured. That is, in the present embodiment, a total sectional area of a flow passage of the outlet 15*b* of the front surface side cooling passage 15A and the back surface side cooling passage 15B is larger than a sectional area of a flow passage of the inlet 15*a*. Accordingly, a stream of the cooling medium being the gas to be measured can be efficiently taken into the cooling passage 15 from the upstream side, and exhausted.

Further, as illustrated in FIGS. 10 and 11, in the chip package 40, a projection portion 45 projecting to the upstream of the main passage 70 is formed, the projection portion 45 is provided with the temperature measuring unit (temperature measuring element) 43, and the cooling passage 15 is formed near the projection portion 45. As described above, the projection portion 45 is formed near the cooling passage 15, and the projection portion 45 is provided with the temperature measuring unit 43, and thus, the gas to be measured from the main passage 70 readily flows around the temperature measuring unit 43, and temperature can be further accurately measured.

In the present embodiment, the projection portion 45 provided with the temperature measuring unit 43 measuring the temperature of the gas to be measured especially projects from the inlet of the cooling passage 15 formed to face the upstream of the main passage 70, to the upstream side of the main passage 70, and thus, the gas to be measured (cooling medium) taken into the cooling passage 15 is allowed to aggressively flow at the projection portion 45.

Further, an inclined wall portion 15*d* inclined relative to the flowing direction of the gas to be measured is formed on the upstream side from the inlet 15*a* of the cooling passage 15 to guide the gas to be measured to the inlet 15*a* of the cooling passage 15. The inlet 14*a* of the second bypass passage 14 is formed in the inclined wall portion 15*d*. As described above, the gas to be measured is guided into the cooling passage 15 to have a larger flow rate, compared to the second bypass passage 14, and cooling efficiency can be increased.

The embodiment of the present invention has been described above in detail, but the present invention is not limited to the above embodiment, and the present invention may be variously modified without departing from the spirit and scope of the present invention as defined in the claims.

In the present embodiment, the first measuring unit is defined as the flow measuring unit, and the second measuring unit is defined as the humidity measuring unit, but the first and second measuring units are not limited to these measuring units, and the physical quantities measured by the measuring units are not particularly limited, as long as the signal processing unit for processing the signals output from the measuring units is provided between at least two measuring units.

Further, in the present embodiment, both of the flow measuring unit and the humidity measuring unit include the heat resistor, but when either one of the measuring units includes the heat resistor, influence of the heat of the heat resistor to the other can be reduced by the cooling passage. In view of such an effect, the heat resistor may be provided at either one of the measuring units.

Further, a projection may be provided at the front surface cover to provide a diaphragm in a passage of the cooling passage, near the signal processing unit. Thus, the flow rate of the gas to be measured (cooling medium) flowing near the signal processing unit in the cooling passage is increased, and the cooling efficiency of the signal processing unit can be increased.

REFERENCE SIGNS LIST

10: thermal flowmeter (air flow measuring device)
11: casing
12: first bypass passage (first sub-passage)
12*a*: inlet of first bypass passage 12
12*b*: outlet of first bypass passage 12
12*c*: back surface side bypass passage
12*d*: penetration portion
12*f*: front surface side bypass passage
14: second bypass passage (second sub-passage)
14*a*: inlet of second bypass passage 14
14*b*: outlet of second bypass passage 14
15: cooling passage
15A: front surface side cooling passage
15B: back surface side cooling passage
15*a*: inlet of cooling passage 15
15*b*: outlet of cooling passage 15
15*d*: inclined wall portion.
18: third bypass passage
20: housing
22: recessed portion for first bypass passage
24: recessed portion for second bypass passage
25A: recessed portion for front surface side cooling passage
25B: recessed portion for back surface side cooling passage
26: partition wall
27: support portion
28: mounting hole
30: cover
30A: front surface cover
30B: back surface cover
40: chip package
41: flow measuring unit
42: humidity measuring unit
42*a*: heat resistor 43: temperature measuring unit
44: large-scale integrated circuit (signal processing unit)
45: projection portion
47: connection terminal
50: pressure measuring unit
61: connector
62: upper surface cover
63: O-ring
64: control circuit board
65: lead frame
70: main passage
71: intake pipe
72: mounting base
IA: intake air (gas to be measured)
EA: exhaust air

The invention claimed is:

1. A physical quantity measuring device comprising:
a chip package molded from a polymeric resin, including a first measuring unit measuring a first physical quantity of a gas to be measured taken from a main passage, a second measuring unit measuring a second physical quantity of the gas to be measured taken from the main passage, and a signal processing unit being connected to the first and second measuring units, the signal processing unit processing signals transmitted from at least the first and second measuring units; and
a casing fixedly storing the chip package, and including a first bypass passage allowing the gas to be measured taken from the main passage, to flow in the first measuring unit, and a second bypass passage allowing the gas to be measured taken from the main passage, to flow in the second measuring unit,
the chip package being configured to dispose the signal processing unit between the first and second measuring units,
the casing having a cooling unit allowing the gas to be measured from the main passage to flow between the first measuring unit and the second measuring unit, and cooling the signal processing unit.

2. The physical quantity measuring device according to claim 1, wherein the cooling unit is a cooling passage formed in the casing, for the passage of the gas to be measured from the main passage.

3. The physical quantity measuring device according to claim 2, wherein a partition wall separating the first measuring unit from the second measuring unit is formed in the casing,
the partition wall partially forming the cooling passage.

4. The physical quantity measuring device according to claim 2, wherein an intake hole taking the gas to be measured in the cooling passage faces an upstream side of the main passage.

5. The physical quantity measuring device according to claim 2, wherein an opening area of an exhaust hole exhausting the gas to be measured in the cooling passage is larger than an opening area of an intake hole taking the gas to be measured in the cooling passage.

6. The physical quantity measuring device according to claim 2, wherein the chip package has a projection portion formed to project to the upstream of the main passage, the projection portion being provided with a temperature measuring unit for measuring a temperature of the gas to be measured, the projection portion having a cooling passage formed near the projection portion.

7. The physical quantity measuring device according to claim 1, wherein the cooling unit is formed in front and back of the signal processing unit of the chip package.

8. The physical quantity measuring device according to claim 1, wherein the first measuring unit is a thermal, flow measuring unit for measuring, as the first physical quantity, the flow rate of the gas to be measured in the first bypass passage, and
the second measuring unit is a humidity measuring unit for measuring, as the second physical quantity, the humidity of the gas to be measured in the second bypass passage.

* * * * *